(12) United States Patent
Ross (10) Patent No.: US 7,526,792 B2
(45) Date of Patent: Apr. 28, 2009

(54) INTEGRATION OF POLICY COMPLIANCE ENFORCEMENT AND DEVICE AUTHENTICATION

(75) Inventor: Alan D. Ross, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 781 days.

(21) Appl. No.: 10/865,364

(22) Filed: Jun. 9, 2004

(65) Prior Publication Data

US 2006/0005254 A1 Jan. 5, 2006

(51) Int. Cl.
*G06F 17/30* (2006.01)
*H04L 9/00* (2006.01)

(52) U.S. Cl. .................. 726/2; 726/1; 726/4; 726/6; 726/11; 726/12; 726/13; 726/14; 726/27; 726/29; 713/154; 713/166

(58) Field of Classification Search .......... 726/2
See application file for complete search history.

(56) References Cited

U.S. PATENT DOCUMENTS

| | | | | | |
|---|---|---|---|---|---|
| 5,848,233 | A | * | 12/1998 | Radia et al. ............... | 726/13 |
| 5,968,176 | A | * | 10/1999 | Nessett et al. ............ | 726/11 |
| 6,321,338 | B1 | * | 11/2001 | Porras et al. ............. | 726/25 |
| 6,873,988 | B2 | | 3/2005 | Herrmann | |
| 2002/0138643 | A1 | * | 9/2002 | Shin et al. ............... | 709/232 |
| 2003/0115154 | A1 | | 6/2003 | Anderson et al. | |
| 2003/0167405 | A1 | * | 9/2003 | Freund et al. ........... | 713/201 |
| 2004/0039924 | A1 | | 2/2004 | Baldwin et al. | |
| 2004/0103310 | A1 | | 5/2004 | Sobel et al. | |
| 2004/0167984 | A1 | | 8/2004 | Hermann | |
| 2005/0021978 | A1 | * | 1/2005 | Bhat et al. ............... | 713/182 |
| 2005/0210253 | A1 | | 9/2005 | Shigeeda | |
| 2005/0229246 | A1 | | 10/2005 | Parmar et al. | |
| 2005/0246768 | A1 | * | 11/2005 | Hunt et al. ............... | 726/11 |
| 2007/0083750 | A1 | | 4/2007 | Miura et al. | |
| 2007/0195779 | A1 | * | 8/2007 | Judge et al. ............. | 370/392 |

OTHER PUBLICATIONS

Cisco NAC The Development of the Self-Defending Network, Cisco Systems, Inc., 2003 Cisco Systems, Inc. (5 pages).
Non-Final Office Action dated Jul. 30, 2007; Pending U.S. Appl. No. 10/865,367, filed Jun. 9, 2004, inventor Alan D. Ross.
Final Office Action dated Dec. 7, 2007; Pending U.S. Appl. No. 10/865,367, filed Jun. 9, 2004, inventor Alan D. Ross.
Advisory Action dated Jan. 28, 2008; Pending U.S. Appl. No. 10/865,367, filed Jun. 9, 2004, inventor Alan D. Ross.
Non-Final Office Action for U.S. Appl. No. 10/865,367, filed Apr. 21, 2008.
Final Office Action mailed Sep. 10, 2008 for U.S. Appl. No. 10/865,367.

* cited by examiner

Primary Examiner—Kambiz Zand
Assistant Examiner—Jenise E Jackson
(74) Attorney, Agent, or Firm—Blakely, Sokoloff, Taylor & Zafman LLP (57) ABSTRACT

Methods and apparatuses for integration of authentication and policy compliance enforcement. An enforcement agent may reside on a device. If an access assignment is provided to the device in conjunction with authentication, authorization to use the access granted may be restricted by the enforcement agent. In one embodiment a reduced-access assignment is made by an authenticator.

30 Claims, 4 Drawing Sheets

INTEGRATION OF POLICY COMPLIANCE ENFORCEMENT AND DEVICE AUTHENTICATION

RELATED APPLICATIONS

This Application is related to U.S. patent application Ser. No. 10/864,367, entitled "Multifactor Device Authentication," having common Inventorship, and filed concurrently herewith.

FIELD

Embodiments of the invention relate to device authentication, and specifically to integration of enforcement of an access policy with device authentication.

BACKGROUND

Device authentication is one tool used for network security purposes, typically intended to restrict network access to unauthorized users/devices. One authentication method, for example, is specified in the Institute of Electrical & Electronics Engineers (IEEE) 802.1x standard. Traditionally, the concept of device authentication is based on storing and presenting device "credentials" to obtain access to a network. Obtaining access to a network may include receiving an Internet protocol (IP) address, receiving an access channel assignment, etc. Credentials have typically been based on an account/password combination, or are based on a digital authentication certificate, for example, those specified in the International Telecommunication Union (ITU) X.509 standard Recommendation.

Assuming valid credentials are presented, authorization for accessing a network are traditionally provided. One problem associated with traditional authentication of credentials is that the mere fact that a system/device can present an identity and/or valid credentials does not necessarily mean the system/device is properly configured or is not infected with malware. Policy compliance provides a mechanism to evaluate a security of a system, even if the system presents valid credentials and/or the system has been authenticated. Enforcement of compliance to a policy, especially in the form of access restriction, may reduce the risk that a system having malware will be provided access that could result in attack on part or all of a network.

Additionally, access restriction is traditionally handled at an authenticating node, such as with Cisco System's Network Admission Control, where a specially configured server complying to the Remote Authentication Dial-In User Service (RADIUS) standard (the de facto industry standard created by Lucent), proposed as a standard by the Internet Engineering Task Force (IETF) and dynamic access control lists are used to enforce policy-based access restrictions. Such policy-based restrictions have typically been limited to enforcement at the router. One problem with traditional systems and methods is that all the work and complexity of enforcement sits on the network infrastructure. Additionally, in an environment such a as a subnet or a local area network (LAN), enforcement of access restriction does not isolate a device that violates the policy and prevent it from accessing other devices within the subnet.

BRIEF DESCRIPTION OF THE DRAWINGS

The description of embodiments of the invention includes various illustrations by way of example, and not by way of limitation in the figures and accompanying drawings.

DETAILED DESCRIPTION

In a traditional authentication sequence or routine, a device seeking authentication, e.g., for purposes of obtaining a network access assignment, presents credentials to an authenticator. In one embodiment if the device is authenticated as having presented valid credentials, the access assignment made by the authenticator may depend upon whether the device is also compliant with a security policy. In one embodiment a device may include a module, either hardware and/or software, on the device that determines compliance of the device with a security policy. The device may be assigned a network access resource, and have restrictions placed on the use of the resource based at least in part on the extent to which the device is compliant with the policy.

Figure 1:
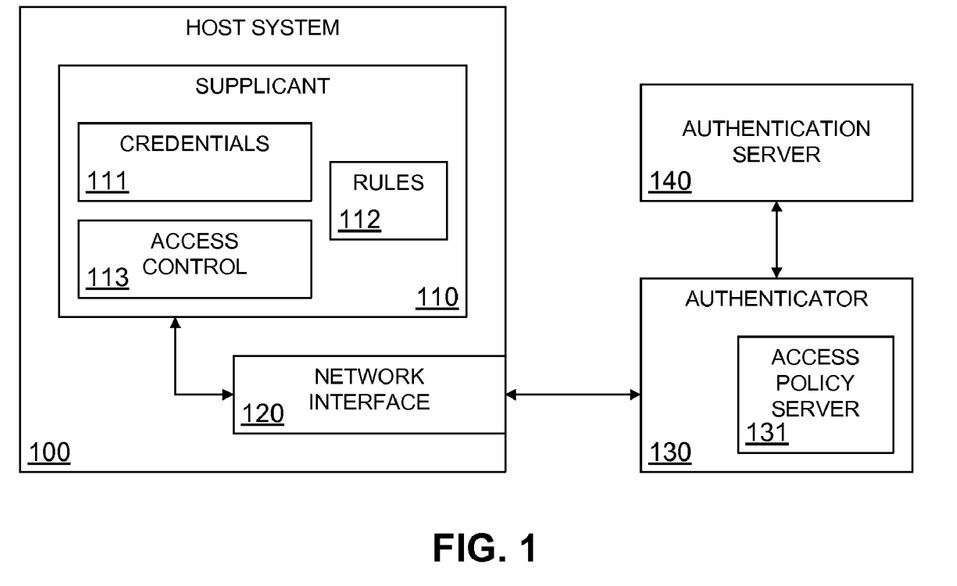
FIG. 1 is a block diagram of a system with a supplicant having access control in accordance with one embodiment of the invention.

FIG. 1 is a block diagram of a system with a supplicant having access control in accordance with an embodiment of the invention. Host system 100 represents a variety of electronic systems or devices. For example, host system 100 may include a personal computer (desktop, laptop, palmtop), a server, a handheld computing device, personal digital assistant (PDA), wireless computing device, cellular phone, game console, set-top box, etc. In one embodiment host system 100 includes network interface 120 to interact over a network with devices external to system 100. Network interface 120 may include a network interface card, a network interface port, a wireless or wireline communication transceiver, etc.

In one embodiment system 100 interfaces with authenticator 130 through network interface 120. Authenticator 130 represents a hardware and/or software entity at a network node, e.g., a switch, a router, or other item of a network infrastructure that provides authentication services to system 100. In one embodiment authentication services are used to verify the identity of system 100 prior to granting authorization to system 100 to access the network. Alternatively, authentication services are used to enable a network port on network interface 120, and authorization to use the port is controlled by another mechanism.

Authenticator 130 may communicate with authentication server, which may reside elsewhere on the network. In one embodiment authentication server 140 is part of authenticator 130. Authentication server 140 either has, or obtains a database, a policy, etc., used to determine validity of credentials presented from system 100. Thus, for example, system 100 may request a network access resource (wired or wireless), and present credentials to authenticator 130 to attest to the identity of system 100. Authenticator 130 may in turn forward the credentials to authentication server 140, which may certify the validity of the credentials and/or indicate an identity, group, etc., to authenticator 130. Authenticator 130 may then make a resource assignment to system 100 based on the determination of authentication server 140.

In one embodiment authenticator 130, and/or access policy server 131, and/or authentication server 140 may include a control mechanism over various access assignments. For example, system 100 may be assigned a particular access channel that is listed with authenticator 130 as only allowing access to a particular group, subnet, etc. In another example, system 100 may be assigned an IP address that only allows system 100 access to an Internet connection and no access to a corporate network.

Supplicant 110 represents an element of system 100 that interfaces with an authenticator. Supplicant may be a software module to execute on a host platform of system 100, a firmware module on a hardware element (e.g., microprocessor, digital signal processor (DSP), logic array, field programmable gate array (FPGA)), a hardware module on system 100, or a combination of these. A platform refers generally to a computing environment, whether hardware or software. A hardware platform may be understood as including a processor and a subsystem, a chipset (one or more hardware elements, potentially with associated circuitry), a circuit, or other computational environment of system 100. A software platform may be understood as an operating system, host program, etc. A module is intended to include one or more instructions, routines/sub-routines, and/or series of logic operations, a function or function call, a series of gates/logic, hardware elements, or a combination of these. Thus, supplicant 110 may exist as code to be executed on a host platform. Alternatively, supplicant 110 may exist as code to be executed by a subsystem (e.g., a network interface circuit) of system 100. Alternatively, supplicant 110 may include a microprocessor circuit.

Supplicant 110 may include various functions, including negotiating a network session. In one embodiment supplicant 110 accesses credentials 111, which may reside internally or externally to supplicant 110, to obtain credentials to present to authenticator 130 for authentication purposes. Presenting credentials may be done according to standard IEEE 802.1x authentication mechanisms. Supplicant 110 may support multiple extensible authentication protocols (EAPs). Supplicant 110 may also include rules 112, which represent a rule, policy, etc., to indicate to supplicant 110 something that should or must be done or not be done to receive authorization to access the network. Something that may be required/preferred for network access may include having operating system updates, having operational malware protection, having particular settings, having a particular application, and/or having an agent operational. Something that may be required/preferred to not have to be able to obtain network access includes having specified applications running, having virus/spyware/worm, have relaxed security settings/configurations, etc.

Supplicant 110 including rules 112 does not necessarily mean that rules 112 are part of supplicant 110. In one embodiment supplicant 110 including rules 112 is understood to mean that supplicant 110 has access to read and modify a storage storing rules 112. Rules may be stored, for example, on a persistent storage device (e.g., a flash, a Trusted Platform Module (TPM), a hard drive) and access by supplicant 110.

In one embodiment supplicant 110 includes access control 113, which may represent a mechanism that may be used to control network access by system 100 over an enabled port. For example, if system 100 presents credentials 111 and is authenticated, authenticator 130 may assign an access resource, e.g., an IP address. The IP address may allow unrestricted access to system 100 on the network. However, in one embodiment access control 113 places limits on the use of system 100 of the IP address it is assigned. Thus, based at least in part upon a compliance determined for system 100 to a security policy specified in rules 112, access control 113 may limit the access system 100 has with the assigned resource. When a mechanism local to host system 100 controls the access of the system, a policy enforcement mechanism may be said to be integrated into the host.

In one embodiment access control 113 functions as an access filter or a firewall. Access control 113, as with supplicant 110 and the various components of supplicant 110, may be implemented as software, hardware, or a combination of software and hardware. In one implementation access control 113 receives from access policy server 131 a version of a policy to enforce. The policy may be stored in rules 112, or may be retained by access control 113 for enforcement. The policy may be updated and a level of compliance may be determined for system 100 whenever a change in a connection is requested/detected. For example, connections may be changed and/or requested at startup, when moving between subnets, when moving between virtual LANs (VLANs), when adding a connection, etc. Each time such a trigger occurs, access control 113 may obtain a current policy from access policy server 131, or it may use a stored copy of a policy until indicated that the policy has been replaced.

In one embodiment authenticator 130 includes access policy server 131, which represents a module (software, hardware, or a combination), to determine an access policy. Access policy server 131 may represent a module used to provide a remediation resource assignment in an implementation where authenticator 130 may provide tiered access assignments based on policy compliance. Access policy server 131 may also represent a module used to provide a policy to access control 113 to indicate a level of authorization that may be granted to system 100 for use of an enabled access resource. Even though shown as part of authenticator 130, access policy server is not necessarily part of authenticator 130, and may be part of another node or may be a node on a network.

Figure 2:
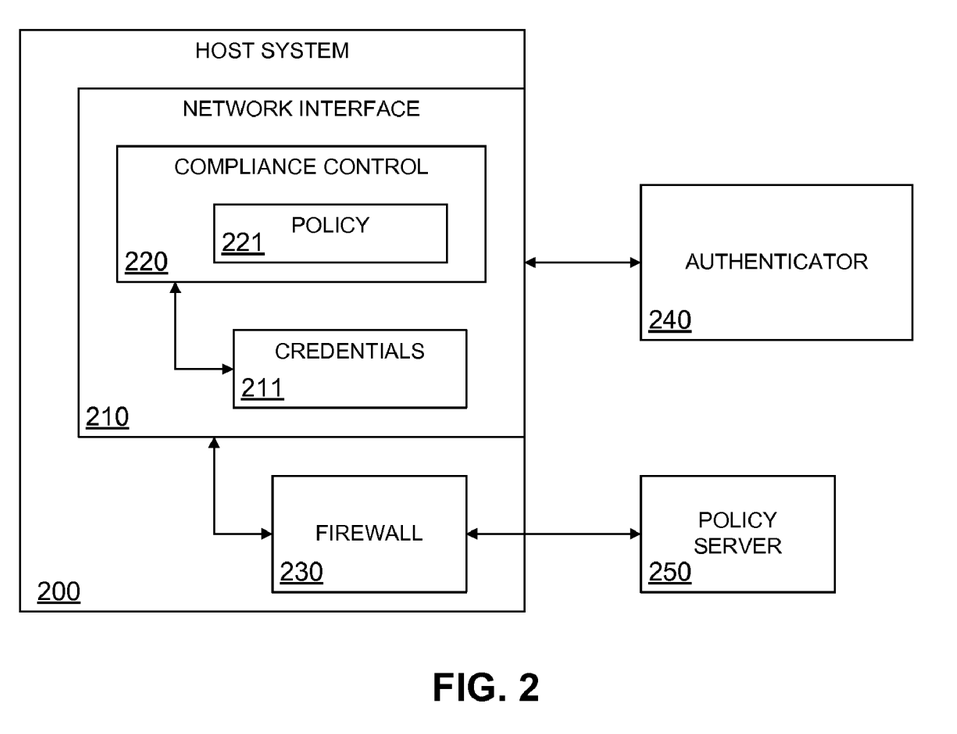
FIG. 2 is a block diagram of a system having a network interface with policy compliance control in accordance with one embodiment of the invention.

FIG. 2 is a block diagram of a system having a network interface with policy compliance control in accordance with an embodiment of the invention. Host system 200 is shown interfaced with authenticator 240 through network interface 210, similar to that discussed above with reference to FIG. 1. In one embodiment network interface 210 includes compliance control 220, rules 221, and/or credentials 211. Credentials 211 represent device attributes, security values (e.g., user name, passcode), digital certificates, etc., that may be used to authenticate system 200 to authenticator 240.

Compliance control 220 represents a module to control authorization of system 200 to an assigned access resource. For example, authenticator 240 may accept credentials 211 and assign an IP address, an access channel, etc., to system 100. Access assignments are traditionally unrestricted at the host system 200 end. Any restrictions (e.g., questions of authorization) are all placed at the end of the system through which host system 200 is connecting, in traditional networks. In one embodiment an access assignment is made to system 200, and compliance control 220 enforces a network access policy at the end of system 200. Compliance control 220 may restrict the use of system 200 to operations/access for which authorization is specified in a policy.

In one embodiment compliance control 220 includes policy 221, which represents a network access policy, security policy, access rule, etc., by which authorization to use network access is specified. Policy 221 may be received from a policy server, such as policy server 250, or through authenticator 240. Policy 221 is not necessarily stored on compliance control 220.

In one embodiment system 200 includes firewall 230, which may be a standalone element of system 200, either in software executing on a main host platform, or as hardware residing on system 200. Alternatively, firewall 230 may include an element of or a function/combination of functions of another element of system 200, for example, network interface 210. Firewall 230 acts to restrict incoming and outgoing network access from/to system 200. In one embodiment firewall 230 interfaces policy server 250. Policy server 250 may be a point on a network infrastructure that determines an access/security policy.

In one embodiment policy server 250 transfers an access control list to firewall 230. An access control list may indicate what access is permitted and/or denied to the specific system 200, or may provide an indication of what is permitted and/or denied based upon a degree of compliance to a policy. Having firewall 230 and/or compliance control 220, which may control authorization/access of system 200 depending upon a degree of policy compliance determined by a compliance agent, a multi-tiered access may be possible. For example, systems can give access based upon full-access (fully compliant), remediation access (not fully compliant), and denied access (not fully compliant and/or not authenticated). A more complex authorization approach may be used where remediation access is further broken into several categories (e.g., 3, 7) based upon a type of compliance and/or authentication. This removes complexity and management burdens of authorization control from the network infrastructure to the local system. Furthermore, using a firewall/compliance agent/access control agent that is transparent (e.g., inaccessible, not visible) to a host operating system provides an access control mechanism that is less susceptible to compromise.

In one embodiment remediation correction may be possible with an access control mechanism on system 200. For example, an access assignment may be granted to host system 200, which is not authorized to access a particular LAN because system 200 is not in full compliance to a security policy specified for accessing the LAN. The access assignment may be restricted by, for example, firewall 230, to prevent access to the LAN by system 200. However, some time after the assignment has been given, system 200 obtains full compliance to the policy. Without having to renegotiate the access assignment, firewall 230 may be allowed to authorize system 200 to access the LAN once it is in compliance with the security policy. In this way the access authorization may be dynamically increased. One mechanism to accomplish this dynamic access authorization upgrade would be for firewall 230 to make a request of policy server 250 at or after the time system 200 upgrades its compliance. An updated access control list may be transferred to firewall 230, which may then provide access to system 200 according to an indication in the control list.

Figure 3:
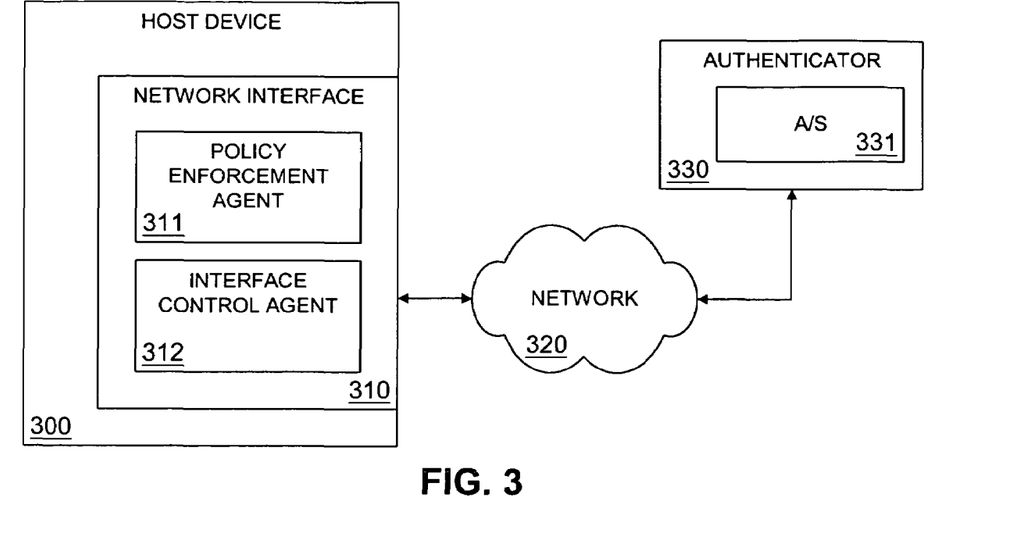
FIG. 3 is a block diagram of a system having a policy enforcement agent and an interface control agent in accordance with one embodiment of the invention.

FIG. 3 is a block diagram of a system having a policy enforcement agent and an interface control agent in accordance with an embodiment of the invention. Host device 300 represents a device or system that may request network access of authenticator 330. Authenticator 330 represents an authenticating entity as described previously. In one embodiment authenticator 330 may include authentication server 331, which may provide authentication services to authenticator 330. For example, authentication server 331 may verify attestation credentials, provide an access policy, etc.

Network 320 represents a physical/virtual link, a communication line, a wireless interface path, etc., over which host device 300 and authenticator 330 interface. Host device 300 interfaces with authenticator 330 and/or other devices over network 320 through network interface 310. In one embodiment network interface 310 includes policy enforcement agent 311 and/or interface control agent 312. Both policy enforcement agent 311 and interface control agent 312 represent modules that may reside on network interface, and do not necessarily represent discrete circuit or software elements, although they may. Thus, policy enforcement agent 311 and interface control agent 312 may represent various circuits, executable routines, logic operations, etc., that potentially span multiple physical devices and/or multiple software routines/programs. Furthermore, the potential features/functions of different embodiments of one agent may overlap with potential features/functions of embodiments of the other agent.

Policy enforcement agent 311 may enable host device 300 to perform compliance scanning to determine a level of compliance and/or to gather data relating to determining compliance. Either a determination of compliance and/or the data related to determining compliance may be forwarded to a policy decision point (if not on host device 300) to determine to what extent an access policy is being observed. A policy decision point refers generally to a device and/or subsystem that determines an approval (including a level of approval) or disapproval of credentials, attestation data, etc. In one embodiment policy enforcement agent 311 controls access of host device 300 in accordance with a compliance decision and/or a remediation assignment made for host device 300. Policy enforcement agent 311 may, for example, configure a host OS and/or application to be limited from certain access, direct a controller of a layer of the network access to prevent certain access, direct a hardware access interface to disallow particular access, etc. In one embodiment policy enforcement agent 311 provides access commands to a firewall on host device 300 to make the firewall comply with a remediation access assignment.

In one embodiment interface control agent 312 executes measures directed by policy enforcement agent 311. Interface control agent 312 may execute access restriction measures directed by a policy enforcement managing module. Interface control agent 312 may include hardware and/or software related to the various layers of network access. For example, elements of Layer 2, Layer 3, and/or the application Layer may be implicated by interface control agent 312. Interface control agent 312 represents a general way for discussion purposes of describing elements involved in restricting, allowing, filtering, or otherwise implementing in host device 300 policy enforcement. Thus, note that interface control agent 312 does not necessarily operate alone, but may work in conjunction with another element(s) of host device 300, e.g., policy enforcement agent 311. In one embodiment interface control agent 312 includes a firewall.

In one embodiment host device 300 defaults to a remediation access through a channel/port on network interface 310. For example, at initialization of host device 300, the device may attempt to request an access channel as part of initialization of a network interface device. Host device 300 may request an access channel by communicating over a link to authenticator 330. Although the access channel may technically be considered not enabled, through the channel host device 300 negotiates an access. Thus, the access is a remediation access, because it may be restricted to access only authenticator 330 until an assignment is made.

In one embodiment the system is scanned when the OS loads, and compliance is evaluated with respect to a security policy. Continuing the example above, if the compliance of host device 300 is found lacking, policy enforcement agent 311 may direct interface control agent 312 to block certain incoming and/or outgoing communications from host device 300 until compliance is upgraded.

Figure 4:
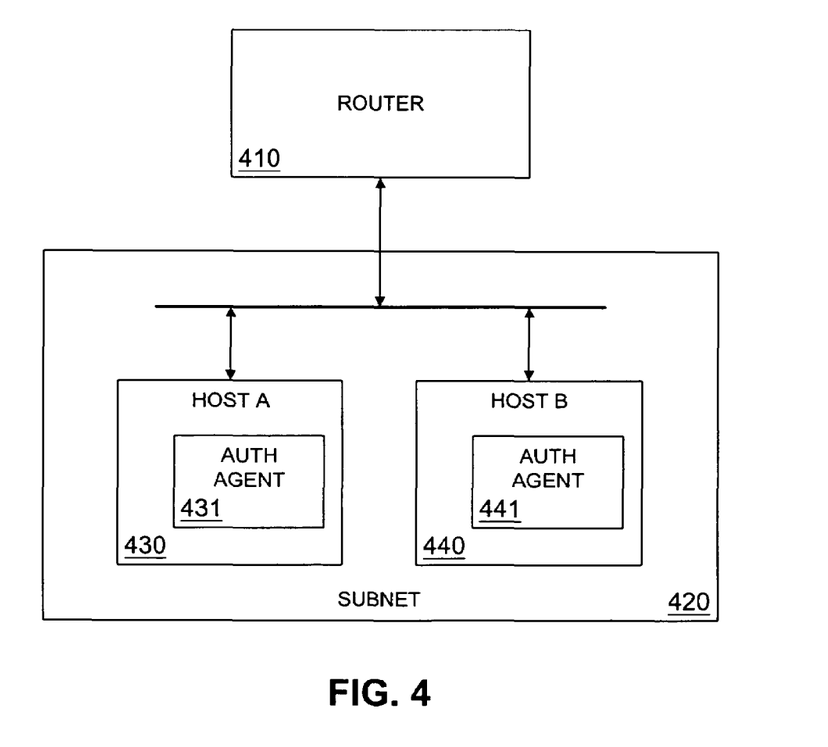
FIG. 4 is a block diagram of devices with authorization agents in a subnet in accordance with one embodiment of the invention.

FIG. 4 is a block diagram of devices with authorization agents in a subnet in accordance with an embodiment of the invention. Router 410 represents a network node that provides a gateway for devices of subnet 420 to access devices outside subnet 420. While described as a subnet, which typically refers to a group according to a protocol (e.g., Internet protocol) that supports subnetting, it is to be appreciated that subnet 420 represents a much broader variety of groups or network subsets.

Note that host A 430 includes authentication agent 431, which broadly represents the ability of host A 430 to support remediation access assignments and/or on-host policy enforcement. The integration of authentication and policy enforcement through combinations described herein allow isolation of host A 430. For example, a remediation assignment may include restrictions of access by host A 430 at the host. Depending on the nature of the policy violation, authentication agent 431 may restrict host A 430 quite severely. Thus, host A 430 may be isolated from the network at the device itself, which would lessen the effectiveness of an attempted denial of service (DoS) attack on router 410, and/or the ability of host A 430 to access and infect host B 440. Note that although host B 440 is shown with authentication agent 441, host B 440 does not necessarily require anything to be protected from host A 430, which is isolated not from external devices, but from within itself. If host B 440 included authentication agent 441, it would similarly serve to protect other devices in subnet 420.

Figure 5:
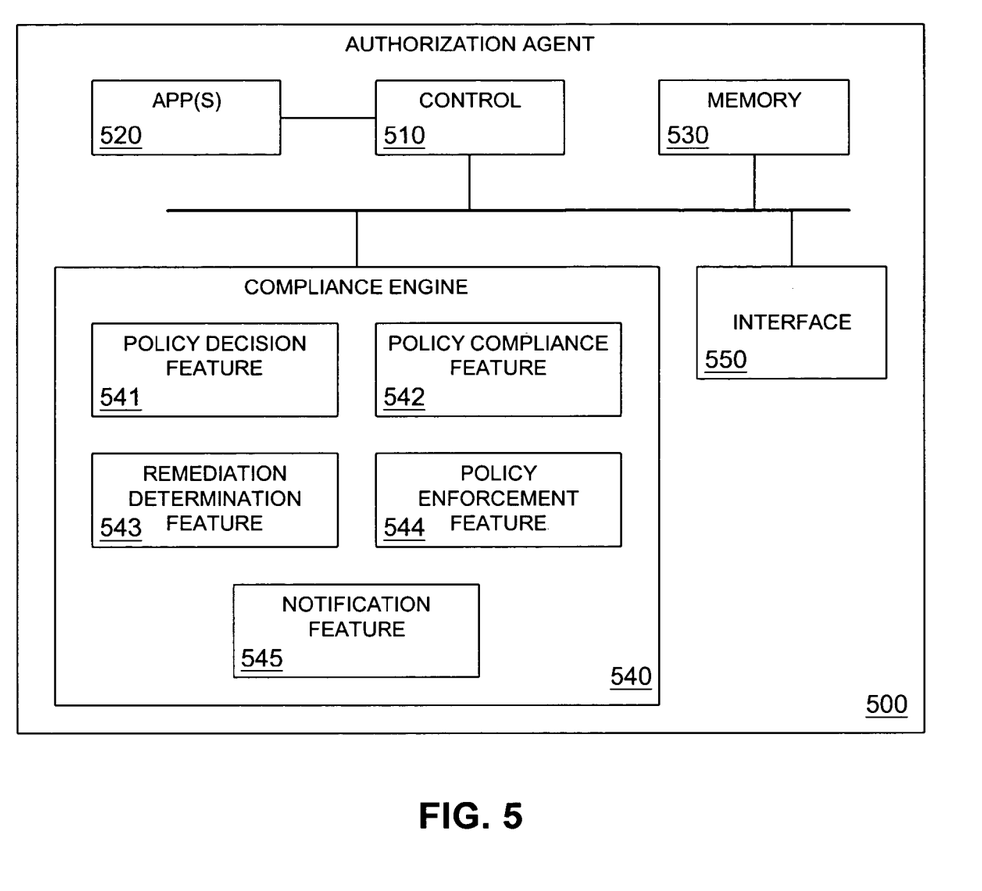
FIG. 5 is a block diagram of an authorization agent in accordance with one embodiment of the invention.

FIG. 5 is a block diagram of an authorization agent in accordance with an embodiment of the invention. Authorization agent 500 represents a circuit, a combination of logic, firmware or group/series of instructions for execution on a computation/logic device, a subsystem, or a virtual subsystem that is configured, enabled, or otherwise able to perform operations related to integration of authentication and policy enforcement services. Control logic 510 directs the flow of operation of agent 500. In one embodiment, control logic 510 is a series of software/firmware instructions to perform logic operations. In another embodiment, control logic 510 can be implemented by hardware control logic, or a combination of hardware-based control logic and software instructions.

Interface 550 provides a communications interface between agent 500 and an external electronic system (not shown) and/or network. For example, agent 500 as part of a host computing system may have interface 550 to provide a communication interface between agent 500 and the host computing system via a system bus. In one embodiment interface 550 includes a communication path to a network. For example, interface 550 may include an interface to an Ethernet, Internet, wireless communication channel, etc. The communication path may be private to agent 500, shared with other agents, or an access path more widely available to a system of which agent 500 is a part. If the communication path is shared, it could be arbitrated, as is understood in the art.

Agent 500 may include applications 520. Applications 520 represent one or more programs and/or other series of instruction sequences that are executed on control logic 510. In one embodiment agent 500 may execute part of all of a user application or a system application. Applications 520 may provide instructions to control logic 510 to cause agent 500 to perform operations. Instructions may also be provided to control logic 510 by memory 530. For example, control logic 510 may access, or read a portion of memory 530 to obtain instructions to perform a series of operations and/or data for use with operations. Thus, control logic 510 can receive one or more instructions from internal application software running locally on compliance agent 500, such as applications 520, from memory 530, and/or from external applications, storage media, etc., through interface 550.

Agent 500 includes compliance engine 540. In one embodiment agent 500 may perform operations including reading from a memory, comparing values to expected values, data collection, sending of results, performing network access filtering, directing a firewall to enforce access restrictions, etc., to operate to integrate authentication with policy compliance enforcement. Compliance engine 540 is shown with various features, which represent functions or features that compliance engine 540 may provide. Each function or feature is provided through performing one or more operations. Compliance engine 540 may include one or more of: policy decision feature 541, policy compliance feature 542, remediation determination feature 543, policy enforcement feature 544, and notification feature 545. In one embodiment one or more of these features may exist independently of and/or be external to agent 500. Thus, compliance engine 550 may be more complex or less complex, containing some, all, or additional features to those represented in FIG. 5.

Policy decision feature 541 enables agent 500 to ascertain a policy that will be enforced on a monitored device. In one embodiment policy decision feature 541 obtains a policy from a remote location, such as from a node/entity on the network. The policy may be obtained at one point and used at a later point, and/or used upon obtaining the policy. Obtaining a policy may include a firewall service obtaining an access control list to indicate a policy for the device. A policy may include one or more of: an application whitelist of applications that must be present, an application blacklist of applications that must not be present, a platform update version indication, an antivirus version indication, settings and/or configurations to cause to be set/unset, etc.

Policy compliance feature 542 enables agent 500 to determine compliance based on a compliance scan. In one embodiment policy compliance feature 542 determines from information gathered/generated during a compliance scan a level of compliance of the system/device agent 500 is enforcing. This may include accessing a copy, whether local or remote, of an access policy determined by policy decision feature 541 to determine whether there is compliance. A compliance scan used by policy compliance feature 542 may not necessarily be performed by agent 500. The compliance scan may, for example, be performed by a scanning agent whose reports are available to agent 500. Policy compliance feature 542 may include many tiers of compliance that may be assigned based on numerous factors, according to the individual policy being enforced.

Remediation determination feature 543 enables agent 500 to determine a remediation assignment for a device. Remediation determination feature 543 may include receiving a remediation assignment from an authenticating entity. Remediation determination feature 543 may also include receiving an access control list with specific access variables specified. In one embodiment compliance engine 540 includes in memory 530 a master remediation policy that indicates steps corresponding to a particular level of remediation. Thus, an access assignment may indicate a level of remediation, and agent 500 is able to determine what functions/operations to perform to enforce the remediation policy. Alternatively, one or more specific functions/operations may be assigned from a remote server, the authenticator, etc.

Policy enforcement feature 544 enables agent 500 to execute and/or cause to be executed the remediation procedures for a remediation access assignment. These may include restricting access, altering settings/configurations, disabling functions, etc. This may also include causing particular functions and/or programs to execute. Policy enforcement feature 544 thus allows application of the policy at the device to integrate policy enforcement with access authorization. In one embodiment policy enforcement feature 544 includes a firewall. For example, a hardware firewall included in hardware representing policy enforcement feature 544 and/or responsive to control logic/code of policy enforcement feature 544. A software firewall may be included as a program/function/module of software used to implement policy enforcement feature 544.

Notification feature 545 enables agent 500 to notify an external entity of its operations. For example, agent 500 may, through compliance engine 540, determine a compliance level of a device. This compliance level and/or data that indicates the compliance level may be reported to an authenticating entity for use in making an access assignment. Agent 500 may also determine functions to perform to restrict a device from particular network access. Such a determination may be reported to a policy server, for example, to determine if the intended functions are acceptable to the policy server.

In one embodiment agent 500 is implemented with firmware, software, or a combination of firmware and software. Agent 500 may be implemented in hardware and/or a combination of hardware and software and/or firmware. The software and/or firmware content may provide instructions to cause executing hardware to perform various operations, including some or all of the functions/features described above. Instructions to cause a machine/electronic device/hardware to perform the operations may be received via an article of manufacture. An article of manufacture may include a machine accessible medium having content to provide the instructions. A machine accessible medium includes any mechanism that provides (i.e., stores and/or transmits) information in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc.

Figure 6:
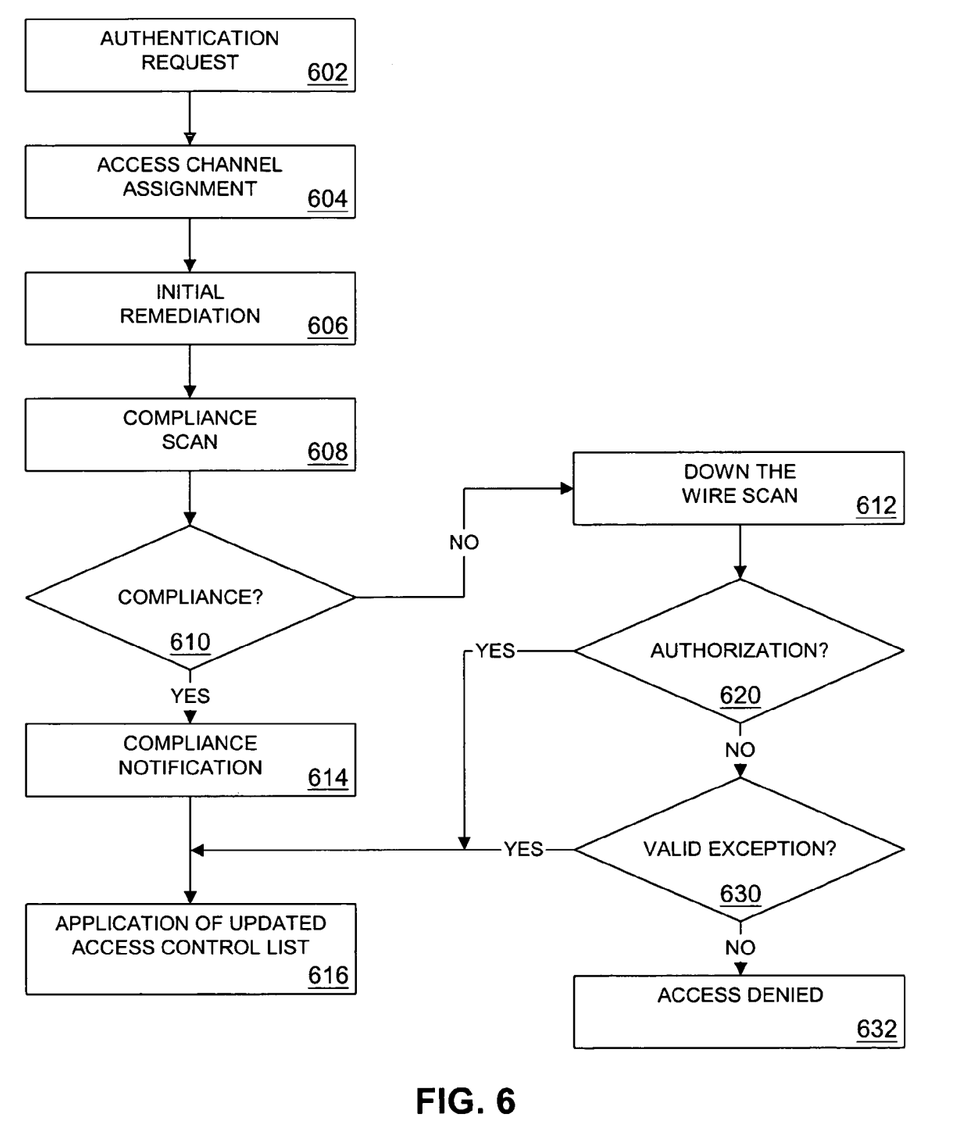
FIG. 6 is a flow diagram of authentication and authorization in a system with integrated authorization and enforcement in accordance with one embodiment of the invention.

FIG. 6 is a flow diagram of authentication and authorization in a system with integrated authorization and enforcement in accordance with an embodiment of the invention. An authentication request is made, 602. The authentication is generally made by a device seeking access to a network, either to acquire a resource at an initialization phase, or in conjunction with a transition in connection parameters. Credentials may be presented in conjunction with an authentication request.

In one embodiment authentication is successful, and an access channel assignment is made, 604. In one embodiment an access channel assignment is made also if authentication is not successful; however, the access channel assignment may be different in the case of failed authentication. A remediation assignment may be used in the case where an access assignment may be granted even if authentication fails, 606. The remediation assignment may include very restricted access. If a remediation assignment is made that grants very limited access, the device may be isolated from other devices on the network, but still be allowed an opportunity to cure the defective authentication. For example, the device may be allowed access to a control channel for the purpose of attempting authentication at a later point.

A channel assignment made prior to a compliance determination may be a remediation assignment. In one embodiment all channel assignments are preliminary until policy compliance is determined. A preliminary assignment may be remedial to prevent a device from attacking a network prior to determining if the device is secure. A preliminary assignment may be made on startup of a device, prior to loading of an operating system environment under which other elements of a successful scan would become operational. For example, antivirus software will typically not become available until an operating system provides a computing environment on which to run such an application.

A compliance scan is performed if a compliance scanning agent is present on the device, 608. This compliance scan may be performed autonomously by the compliance agent. In one embodiment the compliance scan may be initiated by the agent. Alternatively, a supplicant agent may cause a scanning agent to perform a scan. If the compliance scan shows compliance, 610, a compliance notification may be transmitted, 614. Compliance may be complete, or sufficient for at least some access assignment to be made. Complete, or full compliance indicates that a device is observing at least critical elements of a network access policy. Observance of critical elements of the network access policy ensures security of the device sufficiently to enable the devices network interface. Less than full compliance may place the device in a remediation state that may be correctable by appropriate action by the device. A compliance notification may be sent, for example, to, e.g., a compliance server, a policy server, an authenticating entity, for purposes of obtaining a proper access assignment.

In one embodiment the compliance scan fails, and a down the wire scan may be performed, 612. A down the wire scan indicates a compliance scan that may take place if a compliance agent is not running on the device and/or if a compliance scan failed to execute or failed to produce a compliance result. A down the wire scan may be initiated by an entity other than the compliance agent and/or another agent involved in authentication. In one embodiment a user-initiated compliance scan may be performed on a device by allowing a user to cause a compliance scan to execute (e.g., running a script, clicking on an application "button"). It is determined if the down the wire scan produces a compliance result that permits an authorization, 620. The authorization may be full or partial, depending on the level of compliance of the device.

If compliance is determined from either an agent-based scan and/or a down the wire scan, an enforcement module on the device is permitted to enable at least some authorization to access the network. A device that has some authorization may be part of a group recognized to have a particular authorization, or have a specific authorization set forth for the device. Thus, an access control list may reflect the authorization granted to the device. Application of the updated access control list then authorizes the device to access according to the permission granted.

If no authorization is given to access the network, an exception may be determined, 630. A valid exception may include various elements, including, but not limited to: an IP address, a media access control (MAC) address, an extensible authentication protocol (EAP) credential, and a user authentication. Appropriate access may be granted based upon the elements presented for a valid exception attempt, 616. If a valid exception is determined to not exist, access may be denied, 632.

Reference herein to "embodiment" means that a particular feature, structure, or characteristic described in connection with the described embodiment is included in at least one embodiment of the invention. Thus, the appearance of phrases such as "in one embodiment," or "in alternate an embodiment" may describe various embodiments of the invention, and may not necessarily all refer to the same embodiment. Besides what is described herein, it will be appreciated that various modifications may be made to embodiments of the invention without departing from their scope. Therefore, the illustrations and examples herein should be construed in an illustrative, and not a restrictive sense. The scope of the invention should be measured solely by reference to the claims that follow.

What is claimed is:

1. A method for controlling network access, comprising: receiving an access assignment at a supplicant on a host device in an authentication sequence, the supplicant to negotiate the access assignment, the access assignment providing access by the host device to a network; determining compliance of the host device to an access policy for the network by an embedded policy compliance enforcement agent of the host device, the determining compliance performed at the host device with a compliance agent of the host device;

and restricting access by the host device to the network on the received access assignment with the embedded policy compliance enforcement agent on the host device, including reducing access on the received assignment based at least in part on the compliance determination, the restricting access including isolating from the network at least part of the traffic originating from the host device.

2. A method according to claim 1, wherein receiving an access assignment comprises receiving an Internet protocol (IP) address.

3. A method according to claim 1, wherein receiving an access assignment comprises receiving a wireless access channel.

4. A method according to claim 1, wherein restricting network access comprises isolating the host device from other devices on a network.

5. A method according to claim 1, wherein restricting access with the enforcement agent comprises restricting access with a software-based access filtering module.

6. A method according to claim 1, wherein restricting access with the enforcement agent comprises restricting access with a firewall.

7. A method according to claim 1, wherein restricting access with the enforcement agent based on the compliance determination comprises restricting access according to one of multiple tiers of access authorization, based at least in part upon a tier of access authorization indicated by the compliance determination.

8. An article of manufacture comprising a machine accessible medium having content stored thereon to provide machine-executable instructions to cause a machine to perform operations including: receiving an access assignment at a supplicant on a host device in association with authenticating the host device for network access by the host device to a network, the supplicant to negotiate the access assignment, the access assignment providing access by the host device to a network; determining compliance of the host device authenticated for network access to a network policy, the determining compliance performed at the host device with an embedded policy compliance enforcement agent of the host device; and restricting network access of the host device to the network with the embedded policy compliance enforcement agent on the host device, including reducing access on the received assignment based at least in part on the compliance determination, the restricting access including isolating from the network at least part of the traffic originating from the host device.

9. An article of manufacture according to claim 8, wherein the content to provide instructions to cause the machine to perform operations including receiving an access assignment comprises the content to provide instructions to cause the machine to perform operations including receiving an Internet protocol (IP) address.

10. An article of manufacture according to claim 8, wherein the content to provide instructions to cause the machine to perform operations including receiving an access assignment comprises the content to provide instructions to cause the machine to perform operations including receiving a wireless access channel.

11. An article of manufacture according to claim 8, wherein the content to provide instructions to cause the machine to perform operations including restricting access with the enforcement agent comprises the content to provide instructions to cause the machine to perform operations including restricting access with a software-based access filtering module.

12. An article of manufacture according to claim 8, wherein the content to provide instructions to cause the machine to perform operations including restricting access with the enforcement agent comprises the content to provide instructions to cause the machine to perform operations including restricting access with a firewall.

13. An article of manufacture according to claim 8, wherein the content to provide instructions to cause the machine to perform operations including restricting access with the enforcement agent based on the compliance determination comprises the content to provide instructions to cause the machine to perform operations including restricting access according to one of multiple tiers of access authorization, based at least in part upon a tier of access authorization indicated by the compliance determination.

14. An apparatus to enforce a network policy, comprising a supplicant to negotiate an access assignment with an authenticator, the access assignment providing access to a network by a host device on which the supplicant resides; a network interface circuit having an embedded circuit with a compliance module to be embedded on the host device to determine an observance of the host device of a security policy associated with access by the host device to a network with which the host device authenticates; and an enforcement module to be embedded on the host device to control network access of the host device based at least in part on the observance determination of the compliance module and an authentication of the host device, the enforcement module to restrict access of the host device to the network if the host device is determined to not be in observance of the security policy, including isolating from the network at least part of the traffic originating from the host device.

15. An apparatus according to claim 14, wherein the enforcement module to be embedded on the host device comprises the enforcement module to be embedded on a network interface card on the host device.

16. An apparatus according to claim 14, wherein the enforcement module to be embedded on the host device comprises the enforcement module to be embedded on a hardware sub-system of a hardware platform the host device.

17. An apparatus according to claim 14, wherein the enforcement module to control network access further comprises the enforcement module to include a firewall to filter network incoming and outgoing network traffic associated with the host device.

18. An apparatus according to claim 14, wherein the enforcement module to control network access comprises the enforcement module to modify settings of a network communication layer.

19. An apparatus according to claim 14, wherein the enforcement module to control network access based on the observance determination further comprises the enforcement module to apply access restrictions specified in an access control specification received from a policy server.

20. An apparatus according to claim 14, wherein the enforcement module to control network access comprises the enforcement module to prevent authorization to the host device to an access that would otherwise be permitted under an access assignment received for the host device.

21. An apparatus according to claim 20, further comprising the enforcement module to reduce an access restriction on the host device to allow authorization to an access permitted under access assignment if the host device increases observance of the policy subsequent to the prevented authorization.

22. An apparatus according to claim 14, wherein the enforcement module to control network access based on the authentication comprises the enforcement module to enforce access restrictions on the host device based at least in part on an access specified for a class of users of which the host device is determined to be a part.

23. A system comprising:
a supplicant to negotiate an access assignment with an authenticator, the access assignment providing access to a network by a host device on which the supplicant resides; and
an embedded circuit on the host device having an embedded policy compliance enforcement agent coupled with the supplicant to enforce rules for reducing access on the assignment negotiated by the supplicant based at least in part on a level of compliance of a host device to a network security policy, including determining compliance of the host device to the network security policy for the network, and restricting access by the host device to the network on the negotiated access assignment, the restricting access including isolating from the network at least part of the traffic originating from the host device.

24. A system according to claim 23, wherein the policy compliance enforcement agent to enforce the rules for reducing access further comprises the policy compliance enforcement agent to issue commands to a firewall that controls traffic on the system.

25. A system according to claim 23, wherein the policy compliance enforcement agent to enforce the rules for reducing access based on the level of compliance of the host device further comprises the policy compliance enforcement agent to reduce access according to a level of a tiered access rule corresponding to the level of compliance.

26. A system according to claim 23, wherein the embedded policy compliance enforcement agent comprises a module embedded on a network interface sub-system.

27. A system according to claim 23, wherein the embedded policy compliance enforcement agent comprises a module embedded on a chipset of a hardware platform of the system.

28. A system comprising:
a supplicant to negotiate an access assignment with an authenticator, the access assignment providing access to a network by a host device on which the supplicant resides; an embedded circuit on the host device having, an embedded policy compliance enforcement agent coupled with the supplicant to enforce rules for reducing access on the assignment negotiated by the supplicant based at least in part on a level of compliance of a host device to a network security policy, including determining compliance of the host device to the network security policy for the network, and if the host device is less than completely compliant with an access policy for the network, restricting access including isolation of at least part of the traffic originating from the host device from the network; and a persistent storage device coupled with the embedded circuit to store an access rule, the access rule to include a restriction to correspond to the compliance of the host device with the access policy.

29. A system according to claim 28, wherein the policy application module to apply the access restriction comprises the policy application module to perform on-device firewall operations to apply the access restriction.

30. A system according to claim 28, wherein the policy application module to apply the access restriction comprises the policy application module to isolate the host device from access to other points on the network if the host device is not compliance with the access policy.

* * * * *